March 19, 1957 F. M. WEIL ET AL 2,786,198
RADAR REFLECTOR FOR CIRCULARLY POLARIZED RADIATION
Filed Sept. 20, 1954 2 Sheets-Sheet 1
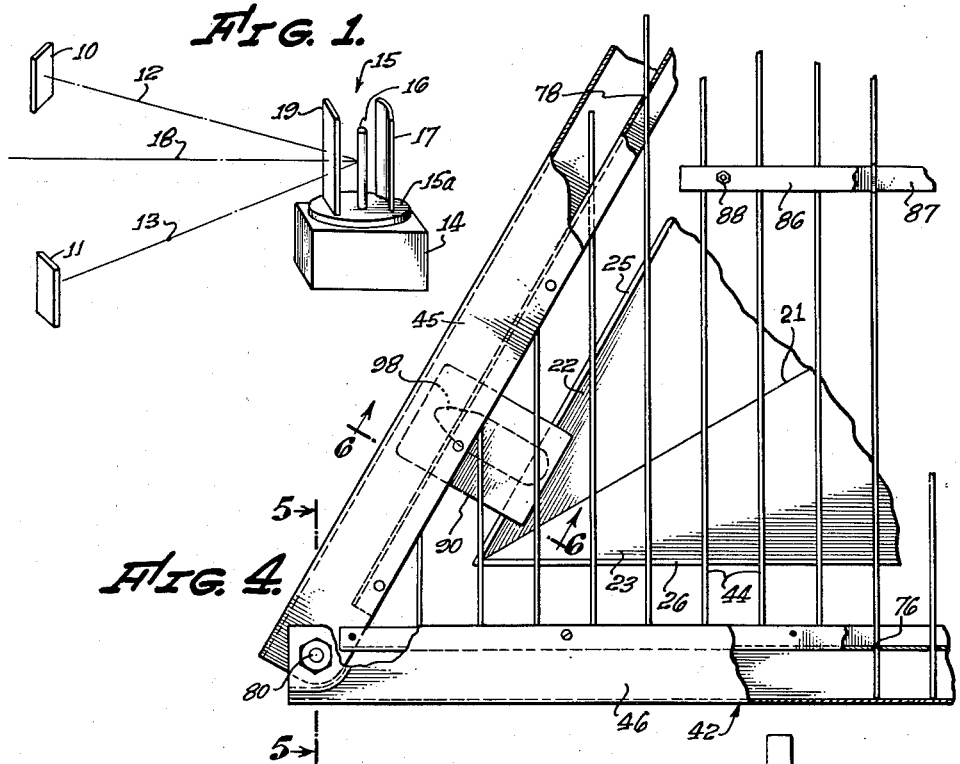
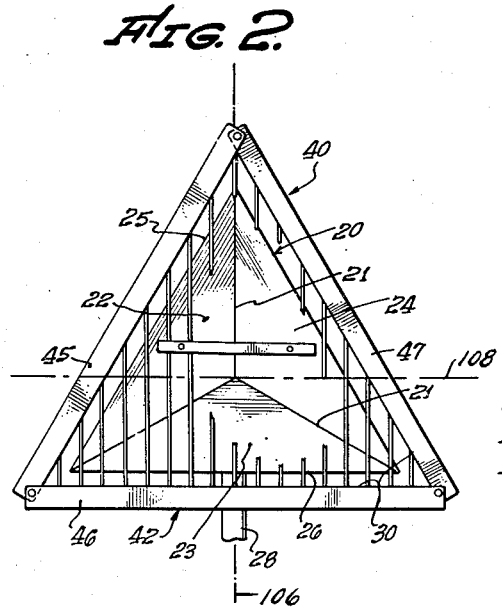
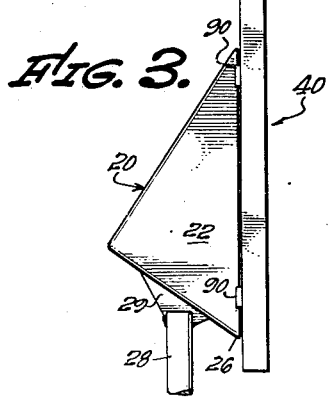
FREDERICK MAURICE WEIL,
MARVIN LEROY INGALSBE,
ROMAR ERNEST STEIN,
JOE GLAZE McCANN,
INVENTORS.
BY
Barkelew & Scantlebury
ATTORNEYS

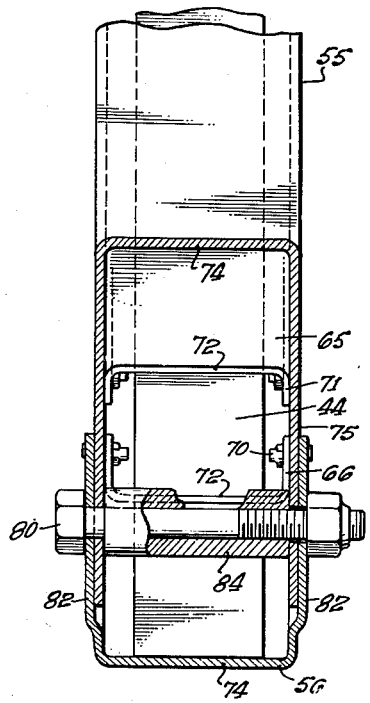
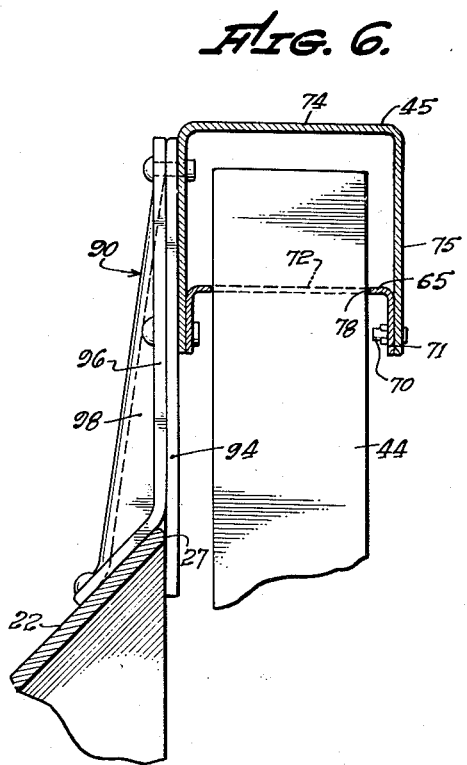
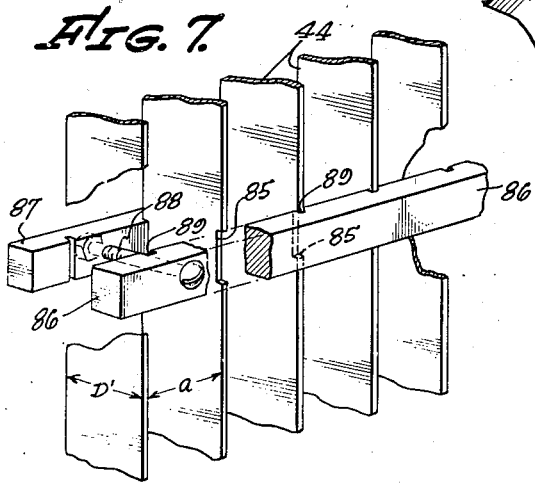

United States Patent Office 2,786,198
Patented Mar. 19, 1957

2,786,198

RADAR REFLECTOR FOR CIRCULARLY POLARIZED RADIATION

Frederick Maurice Weil, La Canada, Marvin Leroy Ingalsbe and Romar Ernest Stein, Los Angeles, and Joe Glaze McCann, Pacific Palisades, Calif., assignors to Gilfillan Bros. Inc., Los Angeles, Calif., a corporation of California Application September 20, 1954, Serial No. 458,404

7 Claims. (Cl. 343—18)

This invention has to do generally with reflectors for radio frequency electromagnetic radiation, particularly in the relatively high frequency range that is utilized typically in radar systems.

It is common practice in aligning radar systems, and for other purposes, to install one or more reflectors in definitely predetermined locations with respect to the antenna, or in definite relation to some fixed or moving object, and to observe on the radar screen the image produced by the reflected signal. Such a reflector may be plane, for example a flat sheet of conductive material, and is then ordinarily oriented in a plane perpendicular to the direction of propagation of the radar beam; or, preferably, the reflector may be a so-called "corner reflector," typically comprising three flat reflecting faces fixedly related at right angles to each other, like an inside corner of a rectangular box. Radiation incident upon such a corner reflector along its axis of symmetry, or along any path within a considerable angle of that axis, is reflected successively from each of the three reflective faces of the reflector, and is returned along a path that is parallel, but oppositely directed, to the path of incidence. Such corner reflectors have the particular advantage that they need not be accurately oriented with respect to the incident radiation in order to reflect it directly back upon itself. Moreover, corner reflectors, like flat single reflectors, reflect linearly polarized radiation without change in its direction of polarization.

A serious disadvantage with plane reflectors and with corner reflectors, and, indeed, with any reflector having an odd number of reflective faces, is that they will not return a visible signal when the radar antenna is circularly polarized, that is to say, when the antenna is arranged to transmit and receive only circularly polarized radiation having a predetermined sense of rotation. That difficulty results from the fact that such odd-sided reflectors reflect electromagnetic radiation essentially unchanged except for reversal of its direction of propagation. Such reversal, in the case of circularly polarized radiation, is equivalent to a reversal of the sense of rotation of the polarization vector. Hence the reflected radiation is circularly polarized in the sense opposite to that of the incident radiation, and also opposite to that which the antenna is capable of receiving. Since circularly polarized radar antennas are finding increasing use, particularly for reducing rain clutter, the failure of conventional odd-sided reflectors to produce an effective echo with such antennas is a serious disadvantage.

An important object of the present invention is to provide an odd-sided reflector that is capable of reflecting circularly polarized electromagnetic radiation without changing the sense of rotation of the polarization vector. A reflector in accordance with the invention has the advantage of producing a visible radar signal with a circularly polarized radar antenna without appreciable loss in return signal strength as compared to conventional linearly polarized operation.

A further important object of the invention is to provide an odd-sided reflector that is capable, without modification, of operating effectively with either a linearly polarized or a circularly polarized antenna. A reflector in accordance with that aspect of the invention not only reflects circularly polarized radiation with substantially undiminished intensity and without reversal of the sense of rotation of the polarization vector; but also reflects linearly polarized radiation having a predetermined direction of polarization with substantially undiminished intensity and without appreciable depolarization or change of direction of the linear polarization.

A further object of the invention is to provide convenient means for modifying existing corner reflectors of the type indicated to make them operate effectively with either linearly or circularly polarized radar antennas, such modifying means being readily installable, and being conveniently removable, if desired, when only linearly polarized operation is required.

The invention further provides particularly effective and convenient mechanism for accomplishing the described objects. Certain features of that mechanism, to be described, constitute a further aspect of the invention.

It can be shown that the voltage introduced into a two-way circularly polarized radar antenna by the echo from a target contains the following voltage amplitude factor $E_i$:

$$E_i = \frac{1}{2}(A^2 + B^2 - 2AB \cos G)^{1/2} \quad (1)$$

where A and B represent the amplitude factors of the target reflection coefficient measured in two mutually orthogonal planes through the radar antenna and the target; and G represents the time phase difference between the electric vectors in the A-plane and in the B-plane. For a conventional three sided corner reflector, and also for a flat sheet reflector, A equals B, and G equals zero. From (1) the value of $E_i$ is therefore zero, and no visible echo is returned from the reflector to a two-way circularly polarized radar antenna.

In accordance with the invention, a grid of suitable type is placed in front of the reflector in such position that the radiation passes through the grid in one direction before reflection and in the opposite direction after reflection from the reflector, the grid being of such a type that the combined effect of that dual transmission of the radiation is to change the value of the phase difference G from zero to substantially 180°, the amplitude factors A and B being substantially unaffected. The result of inserting such a grid is to change the sign of the third term in the parentheses of Equation 1, so that $$E_i = \frac{A+B}{2} \quad (2)$$

The effective echo signal received by the antenna is thus of the same amplitude as if no grid were present and the radar antenna were linearly polarized.

In accordance with the invention, the described action may be provided by a grid of the type that is commonly employed to transform linearly polarized radiation into circularly polarized radiation, or the reverse. Such a grid typically comprises an assembly of thin, parallel, equally spaced, conductive plates so arranged that the flat, relatively wide surfaces of the plates directly face each other. The intervening medium between the plates may be air or any other dielectric medium. The grid is placed in front of the reflector, with the plates edge on to the radiation. The size of the grid is preferably sufficient to intercept all radiation reaching the reflector from the radar antenna. The perpendicular spacing $a$ between adjacent plates of the air spaced grid and the electrically effective depth D of the grid in the direction of propagation of the radiation are related approximately in accordance with the equation, $$a = 2D\left(\frac{\lambda}{8D-\lambda}\right)^{1/2} \quad (3)$$

where $\lambda$ is the wavelength of the radiation. The effective depth D of the grid is somewhat greater than the actual width D' of the plates or vanes (Fig. 6) because of the so-called edge effect. To produce the described action and also maintain efficient matching between the interior of the grid and free space, it is preferred that the further relation be approximately satisfied:

$$D = \frac{a\lambda}{(4a^2-\lambda^2)^{1/2}} \quad (4)$$

Relations 3 and 4 may be combined in the relatively simple approximate form:

$$a = 0.67\lambda$$
$$D = 0.75\lambda \quad (5)$$

With a grid of the described type, and substantially satisfying the above relations circularly polarized radiation emitted by the radar antenna is returned by the grid-reflector combination as circularly polarized radiation propagating in the opposite direction but with the original sense of rotation.

That behavior may be understood as follows. The circularly polarized radiation emitted by the antenna can be resolved into two component vectors which are normal to each other in the polarization plane, one of those vectors being chosen normal to the conductive surfaces of the grid and the other parallel to those surfaces. Those vectors are initially in space and time quadrature, with one vector leading the other in phase by 90°. The radiation component represented by the normal vector propagates through the grid unaltered, is reflected by the corner reflector without phase change, and on its return trip propagates again through the grid without change. The normal component therefore appears in the space between the grid-reflector combination and the antenna in its original orientation but travelling in the opposite direction.

When the grid dimensions satisfy Equation 3, the radiation component corresponding to the parallel vector propagates through the grid as in a rectangular wave guide and is advanced in phase by 90°, as compared to the perpendicular component. It is returned by the corner reflector without phase change, and undergoes an additional 90° phase advancement when passing through the grid on its return trip. The total phase shift of the parallel component is therefore 180°, and the parallel component vector appears in free space oriented opposite to the orientation it would have assumed if the corner reflector had not been equipped with the grid. The performance of the grid for both radiation components with a flat reflector is substantially the same as that just described with specific reference to a corner reflector.

The relationship between the parallel and perpendicular components is changed correspondingly. They are still in space and time quadrature, but the vector that was originally leading by 90° in time is now leading by a total of 90°±180°, depending upon whether the leading vector was taken parallel or perpendicular to the grid surfaces. In either case, the vector that was initially leading by 90° is now in effect lagging by 90°. However, since the direction of propagation has been reversed also, the sense of rotation of the resultant vector has not changed. Hence the combination grid and reflector returns a circularly polarized signal to the antenna with the same sense of rotation with which it was emitted. Since that is the sense of rotation to which the antenna responds, a visible radar signal of substantially normal visibility results.

Ordinarily a radar antenna is employed in circularly polarized condition only when special conditions, such as rain or snow, make that necessary or desirable. Under normal conditions, as during fair weather, the antenna may be returned to its normal, linearly polarized condition. It is therefore highly desirable that the means provided by the invention for rendering an odd-sided reflector effective with a circularly polarized antenna should not appreciably impair the effectiveness of the reflector for use with a linearly polarized antenna. That may be accomplished in accordance with the invention by suitable orientation of the grid in azimuth, that is, its orientation about the beam axis between the antenna and the reflector. That orientation must be such that the conducting plates of the grid extend either perpendicular or parallel to the direction of polarization of the antenna when the latter is in linearly polarized condition. Rotation of the grid in azimuth to satisfy that condition does not affect its described operation with circularly polarized radiation. If, for example, the plates are made perpendicular to the direction of linear polarization, the linearly polarized radiation passes through the grid unaltered, both when incident upon the reflector and after reflection therefrom. If the grid plates are parallel to the direction of linear polarization of the antenna, the linearly polarized radiation is advanced in phase by a total of 180° during its two passages through the grid, as already explained for the parallel component of circularly polarized radiation. However, that phase change does not affect the linear polarization of the radiation. Hence, with either perpendicular or parallel azimuth orientation of the grid, the radar antenna receives an echo from the combination of grid and odd-sided reflector substantially as if no grid were present. It is therefore practicable to maintain the grid permanently in position, provided its orientation is as just described, during both linearly polarized and circularly polarized operation of the antenna.

A full understanding of the invention and of its further objects and advantages will be had from the following description of a preferred embodiment, of which description the accompanying drawings form a part. All of the particulars of that description are for purposes of illustration, and are not intended as a limitation upon the scope of the invention, which is defined by the appended claims.

In the drawings:

Fig. 1 is a schematic perspective representing a conventional radar system with alignment reflectors;

Fig. 2 is a front elevation, partly schematic, of an illustrative corner reflector assembly in accordance with the invention;

Fig. 3 is a side elevation, corresponding to Fig. 2;

Fig. 4 is a fragmentary elevation, corresponding to the lower left hand portion of Fig. 2 at enlarged scale and partly broken away;

Fig. 5 is a fragmentary section on line 5—5 of Fig. 4;

Fig. 6 is a fragmentary section on line 6—6 of Fig. 4; and

Fig. 7 is a fragmentary elevation.

Fig. 1 is a schematic representation of a radar system 14 utilizing two radiation reflectors 10 and 11 which receive incident radiation from the antenna assembly 15 along the respective paths 12 and 13. Antenna assembly 15, as illustratively shown, comprises a linear array 16, a cylindrical reflector 17 producing a collimated radiation beam having a beam axis 18, and a removable screen 19, which may be positioned in the radiation beam to control the condition of polarization of the antenna. The antenna assembly is mounted, as on a rotatable platform 15a, for scanning movement of beam axis 18 about a vertical scanning axis. That scanning movement typically causes beam axis 18 to substantially coincide momentarily with the beam directions indicated at 12 and 13, and radiation is then reflected back to the antenna by the reflectors 10 and 11, respectively. With screen 19 in position as shown, the antenna assembly is typically adapted to emit or receive circularly polarized radiation having a definite predetermined sense of rotation of the radiation vector. With screen 19 removed, the antenna assembly is typically adapted to emit or receive linearly polarized radiation having a direction of polarization parallel to the length of emitter 16, which is shown vertical for purposes of illustration. As already indicated, a system of the type shown in Fig. 1 with conventional reflectors at 10 and 11, whether of plane or 3-sided type, is satisfactory for linearly polarized condition of the antenna assembly (screen 19 removed), but does not give satisfactory radar images of the reflectors in circularly polarized condition of the antenna assembly (screen 19 in position).

Figs. 2 and 3 represent somewhat schematically a typical corner reflector assembly for electromagnetic radiation comprising an odd-sided reflector, shown as a typical corner reflector 20, and a grid 40 positioned directly in front of the reflector. Corner reflector 20 typically comprises the represented three isosceles right triangular flat sheets 22, 23 and 24, formed of conductive material and rigidly joined, as by welding, along respective pairs of equal legs to form right dihedral edges 21. The hypothenuse edges 25, 26 and 27 of the three respective reflective sheets thus form an equilateral triangle 30, which will be referred to as the front face of the corner reflector. Such a corner reflector may be mounted in many different ways, depending upon the type of service for which it is intended. For example, a rigid vertical post 28 may be provided, on which the reflector is mounted as by a bracket 29. For purposes of illustration it may be assumed that one of the front edges of the reflector, shown as edge 26, forms the horizontal lower edge of the positioned reflector.

An illustrative reflector grid in accordance with the invention is shown in the drawings, with the general identifying numeral 40. Grid 40 typically comprises a rigid frame 42 in which are mounted a plurality of parallel blades or vanes 44. Frame 42 is preferably of the same general shape as front face 30 of reflector 20, and somewhat larger than that face. In the present instance the grid frame is triangular and is composed of three closely similar frame members 45, 46 and 47. Those frame members comprise respective frame channels 55, 56 and 57 of general U-form, with respective spacing channels 65, 66 and 67 rigidly mounted within them in the relation shown clearly in Fig. 5, for example. As shown, the respective flanges 75 of the frame channels and the flanges 71 of the spacing channels are rigidly connected by the rivets 70, with the flange edges flush. The spacing channel flanges are shallower than the frame channel flanges, so that the webs 72 of the spacing channels are in parallel spaced relation to the webs 74 of the frame channels.

The spacing between opposed flanges 71 of the spacing channels is preferably appreciably greater than the width of blades 44. The webs 72 of the spacing channels are slotted, as indicated at 76 and 78, to receive the end portions of the blades. The slots 76 and 78 are all elongated in a direction perpendicular to the plane of frame 40. The blade ends project inwardly through the slots and about the inner faces of webs 74 of the frame channels, and are longitudinally positioned thereby. Each blade is of such length, as shown best in Fig. 3, that it has some freedom for longitudinal movement, that freedom being insufficient to permit either end to leave its positioning slot in the frame. The blades 44 are all mutually parallel and are equally spaced from their neighbors, that spacing being determined by the locations of the slots 76 and 78.

The blades may, in the broader aspects of the invention, extend in any desired direction in the plane of the frame. It is preferred, however, that they be oriented as shown, perpendicular to one of the frame members. That frame member, typically shown at 46, is preferably horizontal when the grid is in normal operation, and will be referred to for convenience as the base member of the frame. When the frame has the present illustrative shape the blades then form an angle of 30° with the other two frame members 45 and 47, which will be referred to as the oblique frame members. The positioning slots 76 in base frame member 46 provide an accurate sliding fit with blades 44 when in perpendicular relation; slots 78 in oblique frame members 45 and 47 being made wider by a sufficient amount to receive the blades at the oblique angle of 30°. The spacing between adjacent slots 78 is correspondingly greater than that for slots 76 by a factor of two, so that the respective components of those spacings perpendicular to the blades are equal and the blades are maintained in parallel relation.

It is preferred, particularly if the grid includes more than about 20 blades, to provide one or more spacers to maintain correct spacing between the intermediate portions of the blades. Such spacers may comprise two relatively light strips, preferably of dielectric material, extending transversely of the blades, one in front of the blades and one behind, as indicated at 86 and 87, respectively. Those spacing strips are preferably slotted at uniform intervals, as at 89, to receive the blade edges, and are secured together as by the screws 88, clamping the blades between them. To lock the spacer assembly longitudinally of the blades, the slots 89 for two blades near opposite ends of strips 86 and 87 may be shallower than the rest, and corresponding slots provided in the blade edges, as indicated at 85 in Fig. 7.

Frame members 45, 46 and 47 may conveniently be secured in rigid relation by a single bolt through each of the corners of the frame, one such bolt being shown clearly at 80. At each joint, flanges 75 of one of the frame channels are offset outwardly, as indicated at 82 in Fig. 5, to receive the flanges of the other frame channel. Spacer sleeves 84 of suitable length are preferably provided for the bolts.

The entire grid assembly may be mounted on the face of reflector 20 in any suitable manner. As shown, two brackets 90 are rigidly mounted on the back flange of each of the oblique frame members 41 and 43, as by the rivets 91. Brackets 90 extend inwardly parallel to the plane of the frame and have at their inner ends notch formations adapted to receive the forward edge of reflector 20. As shown, each bracket comprises a flat plate 94 and an overlying plate 96 which is formed to provide an oblique end portion 97 and a longitudinal strengthening corrugation 98. With two such brackets spaced longitudinally on each of the oblique frame members 45 and 47, the entire grid frame may be hooked over the oblique upper edges of corner reflector 20. Similar brackets may then be releasably secured to base frame member 46 in engagement with lower edge 26 of the reflector, locking the grid frame in position.

The depth D' of the grid and the spacing $a$ between adjacent blades or vanes 44 are suitably predetermined with respect to the wavelength of the radiation with which the reflector assembly is to be used, in substantial accordance with the relations already discussed above. A reflector assembly mounted with the grid in the typical preferred orientation illustrated, that is, with blades 44 vertical, gives an effective radar signal with a circularly polarized radar antenna (regardless of the sense of the polarization) and also with a linearly polarized antenna provided only that the direction of linear polarization is either substantially vertical or substantially horizontal.

An advantage of the described grid structure is that it may be easily and quickly disassembled, as for storage and transportation, and then reassembled when required for use. By removal of the bolts 80, the three frame members 45, 46 and 47 may be separated, and the vanes 44 slipped out of the slots 76 and 78. With the preferred symmetrical structural shown, the vanes may be divided into pairs, the members of each pair being identical. The respective pairs differ in length, that difference being typically sufficient to cause no confusion, and may differ also in such features as the notches 85.

The frame members may be constructed in any convenient manner that provides an outer web portion, as at 74, and an inner web portion, spaced inwardly of the outer web portion. The structure shown, utilizing two channel members with their flanges rigidly connected, is an illustrative manner of providing such spaced inner and outer webs.

Grid 40 has two definite axes, indicated typically in Fig. 2 at 106 and 108. Axis 106 is parallel to the length of the vanes 44, and axis 108 is perpendicular to those vanes. As already explained, the grid is preferably mounted adjacent the face of the radiation reflector with one of those grid axes parallel to the direction of linear polarization of the radar antenna when the latter is in linear polarized condition.

We claim:

1. A reflector assembly for electromagnetic radiation, comprising a plurality of mutually parallel and uniformly spaced conductive vanes forming a substantially plane grid capable of transmitting radiation incident upon it transversely of the plane of the grid and producing in radiation so transmitted a change of relative phase between the radiation components parallel and perpendicular, respectively, to the length of the vanes, and structure forming an odd-sided radiation reflector mounted adjacent one face of the grid in position to receive radiation transmitted by the grid and to reflect that radiation back through the grid.

2. A reflector assembly for electromagnetic radiation, comprising structure forming an odd-sided radiation reflector having a reflector axis and capable of receiving radiation incident along that axis and returning it in substantially the opposite direction along that axis, and a radiation transmitting grid mounted adjacent the face of the reflector in position to intercept both the incident and the reflected radiation, the grid having a grid axis transverse of the reflector axis and producing in transmitted radiation a change of relative phase between the radiation components parallel and perpendicular, respectively, to the grid axis.

3. In combination with a radar system that includes a radar antenna capable of circularly polarized condition and a corner reflector adapted to receive an incident radiation beam from the antenna and to return a reflected radiation beam to the antenna; means for controlling the condition of polarization of the reflected beam, said means comprising a radiation transmitting grid having two mutually orthogonal grid axes and producing in transmitted radiation a change of relative phase between the radiation components parallel to the respective grid axes, and support means for mounting the grid adjacent the reflector in position to intercept the incident and reflected radiation beams.

4. In combination with a radar system that includes a radar antenna shiftable between linearly and circularly polarized conditions and a corner reflector adapted to receive an incident radiation beam from the antenna and to return a reflected radiation beam to the antenna; means for controlling the condition of polarization of the reflected beam, said means comprising a radiation transmitting grid having two mutually orthogonal grid axes and producing in transmitted radiation a change of relative phase between the radiation components parallel to the respective grid axes, and support means for mounting the grid adjacent the reflector in position to intercept the incident and reflected radiation beams and with the grid axes transverse of the said radiation beams and with one of the grid axes substantially parallel to the direction of linear polarization of the antenna.

5. A radiation transmitting grid for controlling polarization, comprising three elongated frame channels connected at their ends to form a triangular frame, the frame channels being of generally U-section with the channel flanges facing inwardly and the channel webs substantially perpendicular to the plane of the frame, structure forming secondary webs extending between the flanges of respective frame channels in spaced relation to the channel webs, each secondary web having a plurality of transversely extending slots uniformly spaced longitudinally of the channel, and a plurality of flat elongated vanes mounted in mutually parallel relation in the frame, all of the vanes being received near one end by respective slots in the secondary web of one frame channel, and being received near the other end by respective slots in the secondary webs of the other frame channels, the ends of the vanes abutting the inner faces of the main frame channel webs adjacent the respective slots.

6. A radiation transmitting grid for controlling polarization, comprising three elongated frame members connected at their ends to form a triangular frame, each frame member including inner and outer parallel and mutually spaced web portions, the inner web portions having a plurality of transversely extending slots spaced longitudinally of the frame member, said slot spacing being uniform within each frame member, and a plurality of flat elongated vanes mounted in mutually parallel relation in the frame, all of the vanes being received near one end by respective slots of one frame member and being received near the other end by respective slots of the other frame members, the ends of the vanes abutting the inner faces of the said outer web portions adjacent the respective slots.

7. A radiation transmitting grid for controlling polarization, comprising three elongated frame members of equal length connected at their ends to form an equilateral triangular frame, each frame member including inner and outer parallel and mutually spaced web portions, the inner web portions having a plurality of transversely extending slots spaced longitudinally of the frame member, said slot spacing being uniform within each frame member, one of the frame members having twice as many slots as each of the other two frame members, and the slot spacing in the said one frame member being one half that in each of the said other frame members, and a plurality of flat elongated vanes mounted in mutually parallel relation in the frame, all of the vanes being received near one end by respective slots of the said one frame member and being received near the other end by respective slots of the said other frame members, the ends of the vanes abutting the inner faces of the said outer web portions adjacent the respective slots.

No references cited.